Feb. 19, 1935.  H. P. THOMAS  1,991,476
DIRECTION FINDING SYSTEM
Filed Oct. 26, 1932
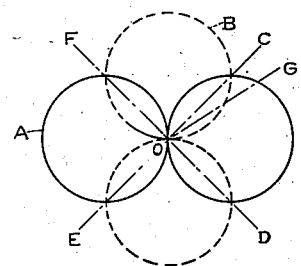
Fig. 1.
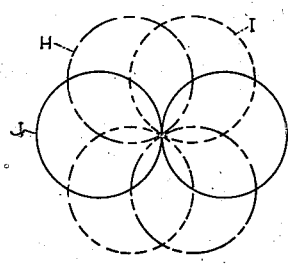
Fig. 5.
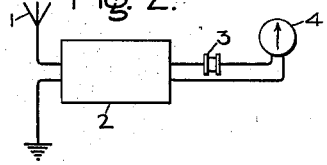
Fig. 2.
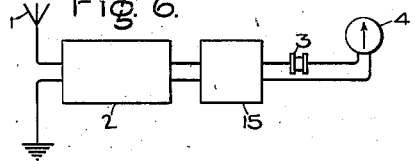
Fig. 6.
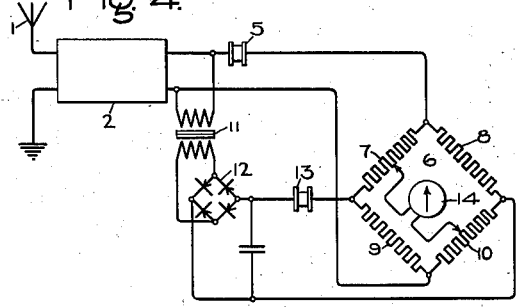
Fig. 4.
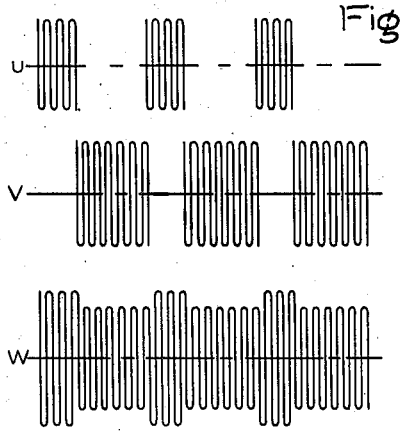
Fig. 3.
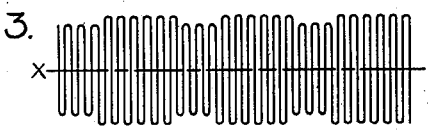
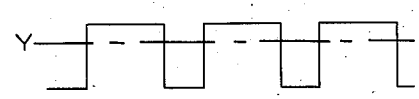
Inventor:
Henry P. Thomas,
by Charles V. Tullar
His Attorney.

Patented Feb. 19, 1935

1,991,476

UNITED STATES PATENT OFFICE 1,991,476

DIRECTION FINDING SYSTEM

Henry P. Thomas, Schenectady, N. Y., assignor to General Electric Company, a corporation of New York Application October 26, 1932, Serial No. 639,592

14 Claims. (Cl. 250—11)

My invention relates to receiving systems and more particularly to systems used for direction finding, radio course indicating and the like.

A substantially instantaneously responsive non-linear resistor is described in U. S. Patent No. 1,822,742 issued to K. B. McEachron, and is commercially known as "Thyrite". This resistor is composed of a dense, homogeneous, inorganic compound of ceramic material; and has the characteristic that when placed in circuit with a source of potential its resistance falls with increase of potential in the circuit. This characteristic of the current and resistance can be expressed in the form of a simple hyperbolic equation as $R=CI^{-a}$; where R is the resistance, I is the density of current in amperes, C is a constant and the exponent $a$ is the slope of the curve represented by the equation when plotted with respect to logarithmic coordinates. The exponent $a$ is less than unity and the constant C may preferably vary between 10 and 600. This material also has the peculiar property of reacting substantially instantaneously to asymmetrical voltage or current wave shapes so that a portion of such waves is rectified and a direct current flows in the circuit; but when symmetrical waves are passed through it no direct current flow occurs. The direction of the direct current flow due to the partial rectification of asymmetrical wave shapes is dependent upon whether the maximum peak of the asymmetrical wave is positive or negative.

It is an object of my invention to utilize such a non-linear resistor in a radio receiver circuit. It is a further object of my invention to provide a radio receiver utilizing a non-linear resistor to produce reliable direct null indications for direction, or course, finding purposes.

A further object of my invention is to provide a radio beacon course system having a beacon transmitter for transmitting in different directions a plurality of waves each modulated with a plurality of low frequency currents all having a predetermined phase relation to each other.

A still further object of my invention is to provide a radio receiver having a non-linear resistor circuit for producing a distinctive response to the phase relation between currents having a phase relation determined by the position of the radio receiver with respect to a radio transmitting station.

A further object of my invention is to provide a radio receiver having a circuit with non-linear characteristic responsive to phase differences between the modulations on a plurality of carrier waves and a harmonic of such modulations.

A further object of my invention is to provide a radio beacon course transmitter and a receiver cooperating therewith having means including such a non-linear resistor for indicating courses other than those formed by the directive transmissions of the transmitter.

The novel features which I believe to be characteristic of my invention are set forth with particularity in the appended claims. My invention itself, however, both as to its organization and method of operation, together with further objects and advantages thereof, will be better understood by reference to the following description taken in connection with the accompanying drawing in which Figs. 1 and 5 illustrate radiation diagrams of radio course beacon transmitting antennæ; Fig. 3 diagrammatically illustrates a form of signals and the manner in which they combine in a receiver embodying my invention. Fig. 2 illustrates an embodiment of my invention and Figs. 4 and 6 illustrate modifications thereof.

Referring to Fig. 1, I have illustrated an antenna pattern which results from loop antennæ arranged at right angles to each other. The pattern A is the Figure 8 radiation pattern of one loop antenna and the pattern B is the Figure 8 radiation pattern of a second loop antenna. These two patterns cooperating together provide four radio beacon courses shown as OC, OD, OE and OF. In one arrangement the carrier wave transmitted in the pattern A may be in the form of a plurality of dots separated by long time intervals. The carrier wave transmitted in the pattern B will constitute a series of dashes equal to the time intervals between the dots transmitted from the pattern A. Along any one of the courses such as OC the intensity of the radiations received from the patterns A and B will be equal, thus producing in the receiver a constant carrier current. Any deviation from a course such as OC will produce a variation in the amplitude of the carrier received, and having an envelope which has a shape dependent upon whether the receiver is to the right or left of the course OC. This envelope of the carrier will produce in the output circuit of the receiver an asymmetrical audio frequency wave. This audio frequency wave may be utilized to give an indication to the pilot of a mobile craft as to whether he is to the right or left of the predetermined course OC.

As an alternative method, the carrier wave radiated from the pattern A may be constant and modulated by a plurality of audio frequency waves as, for example, a fundamental wave and a harmonic thereof having a definite phase relation with respect to the fundamental wave, as expressed by the equation $B(\sin \omega t - K \cos 2\omega t)$; wherein B and K are constants, $\omega$ is $2\pi f$, $f$ being frequency in cycles per second and $t$ is time in seconds. The wave radiated from the pattern B is modulated by a plurality of similar audio frequency waves as expressed by the equation $B(\sin \omega t + K \cos 2\omega t)$. Thus a receiver on a mobile craft moving along the line OC will receive equal intensities from the patterns A and B and the audio output from the receiver will be $B(\sin \omega t - K \cos 2 \omega t) + B(\sin \omega t + K \cos 2 \omega t) = 2B(\sin \omega t)$. In other words, the second harmonic of the fundamental modulation wave cancels out and the simple sine wave will be present in the output circuit when the receiver is on the course OC. If the craft deviates from the course OC, the harmonic of the fundamental modulation received from one of the patterns will predominate in the resultant equation and thus the fundamental and said second harmonic will be present in the output circuit of the receiver.

In Fig. 2 I have illustrated a receiver arrangement embodying my invention which may be utilized for receiving the waves transmitted by a radio beacon having a field pattern such as is illustrated in Fig. 1, and this receiver arrangement will respond to either type of carrier wave transmission. The antenna 1 is connected to a suitable receiver 2. The receiver 2 may comprise a radio frequency amplifier, a detector, an audio frequency amplifier and an output transformer, or the detector may be followed by a direct current amplifier and an output transformer. The purpose of this arrangement will become apparent later. The output circuit of the receiver is provided with a non-linear resistor 3 and a zero-center direct current meter 4. The non-linear resistor 3 is preferably of the type described in U. S. Patent No. 1,822,742 issued September 8, 1931, to K. B. McEachron, but may be composed of any other material or combination of elements which will provide the desired non-linear resistance-current characteristic. An example of such arrangement would be two copper oxide rectifiers of the type described in U. S. Patent No. 1,640,335 issued August 23, 1927, to Lars O. Grondahl, which are connected in parallel and arranged opposite to each other so as to produce a bi-laterally conducting path.

While the output transformer is not essential to the receiver 2, its use is desirable as it eliminates the direct current component which is usually present in the anode circuit of the output tube. The elimination of the direct current component in the output circuit of the receiver which contains the non-linear resistor 3 and the zero-center direct current meter 4, permits the use of a more sensitive direct current meter than would be the case if the direct current component were present. A receiver arrangement utilizing a direct current amplifier would be feasible when the receiver is used in connection with a radio beacon which transmits carrier waves which are interrupted to produce cooperative carrier waves along the various beacon courses.

When the receiver disclosed in Fig. 2 is utilized in connection with a radio beacon of the type referred to in connection with Fig. 1 which transmits carrier waves modulated by a fundamental and a harmonic thereof having a predetermined phase relation to the fundamental, the output circuit of the receiver 2 will have a simple sine wave therein when the receiver is upon the source OC. If the receiver, however, has deviated from the course OC the fundamental frequency and a portion of one of the harmonic frequencies will be present in the output circuit. If a wave of the form $E_1(\sin \omega t) \pm E_2(\cos 2\omega t)$ is present in the output circuit impressed upon the non-linear resistor 3, the behavior of the resistor will be such that, if the exponent $a$ equals $2/3$ in the equation $R = CI^{-a}$, there will be a direct current flowing in the circuit which is of the magnitude $$I_0 = \pm \tfrac{3}{4} \times \left(\frac{E_1^2 E_2}{C^3}\right).$$

In other words, this means that as long as the receiver is on the line OC the zero-center meter 4 will remain at zero but a departure from the course OC will cause a deflection of the meter 4 to either the left or right, dependent upon whether the deviation from the course OC is to the right or left of the course. The receiver will act similarly along the courses OD, OE and OF.

When the receiver shown in Fig. 2 is used with a beacon of the type which transmits carrier waves which are interrupted so as to produce cooperative carrier waves in the section on the course OC, the operation of the receiver will be as follows: Along the course OC the intensities of the carrier waves received from the patterns A and B will be equal and the receiver 2 will receive a constant amplitude continuous carrier wave and no audio frequency will be present in the output circuit. If, however, the receiver deviates to the right or left of the course OC, the intensity of the carrier wave received from one of the patterns A or B will predominate over the carrier wave received from the pattern B or A. These two carrier waves will then combine in the receiver 2 to produce a carrier wave having an envelope which has an asymmetrical wave shape. This asymmetrical wave shape of the envelope will be transmitted to the output circuit of the receiver 2 by the action of the detector and the output transformer as an asymmetrical audio frequency wave. This asymmetrical audio frequency wave will be acted upon by the non-linear resistor 3 to produce a direct current which will actuate the zero-center meter 4 to give an indication to the pilot of the mobile craft that he has deviated to the right or left of the course OC.

The operation of the receiver under this condition may be better understood by reference to Fig. 3 in which the curve U illustrates the carrier frequency impulses transmitted within the pattern A; and the curve V illustrates the carrier frequency impulses transmitted within the pattern B. A deviation to the right of the course OC, for example, may produce a wave such as shown in curve W, whereas a deviation to the left of the course OC will produce a curve such as shown at X. A carrier wave such as W will be changed by the action of the detector and the output transformer of the receiver 2 to produce an audio frequency wave such as shown at Y, and a carrier wave such as shown at X will be changed by the detector and the output transformer of the receiver 2 into an audio frequency wave such as shown at Z. The audio frequency waves shown at Y and Z have been exaggerated for the sake of clearness but it will be understood that waves similar to these will be produced by the detector and the output transformer when the envelope of carrier waves such as W and X is sufficiently amplified. The output transformer eliminates the direct current component present in the output circuit of the output tube, and the inherent action of a transformer is such that the positive and negative areas of waves such as X and Z are maintained equal. Thus, for example, in an audio frequency wave such as Y the positive and negative areas of the halves of the wave are equal, although the amplitude of the negative half of the wave is considerably greater than the positive half of the wave. The asymmetrical audio frequency waves such as shown at Y and Z will be acted upon by the non-linear resistor 3 to produce direct current components in one direction or the other which will actuate the zero-center meter 4 to the right or left.

If the receiver in Fig. 4 be used with a 4-course radio beacon of the type referred to in connection with Fig. 1 which transmits carrier waves modulated by a fundamental low frequency and a harmonic thereof having a certain predetermined phase relation to the fundamental frequency, any desired one of a number of additional courses, such as OG shown in Fig. 1, may be obtained. A suitable antenna 1 is connected to a receiver 2 which is provided with a detector, audio and radio frequency amplifiers and an output transformer. The output circuit of the radio receiver 2 comprises two branch circuits one of which is connected through a non-linear resistor 5 to opposite points of a bridge 6. The bridge 6 is composed of four resistors 7, 8, 9 and 10. The other branch of the output circuit is connected through an audio frequency transformer 11 to a full-wave rectifier circuit 12. This full-wave rectifier circuit may be made up of any suitable rectifiers but is preferably composed of oxide rectifiers of the type described in the U. S. Patent No. 1,640,335 issued August 23, 1927, to Lars O. Grondahl. The output of this rectifier circuit is connected through a non-linear resistor 13 to the opposite sides of the bridge 6. A zero-center direct current meter 14 is connected between the resistors 7 and 10 by means of adjustable contacts.

The rectifier 12 produces a current which is proportional to the cube of the voltage present in the output circuit of the receiver 2. If the current produced by the rectifier 12 and the current flowing through the non-linear resistor 5 are combined in the bridge circuit 6, a zero reading of the direct current meter 14 indicates a definite ratio of the two currents which may be expressed by the following equations: $I_1 = K_1 E_1^2 E_2$ which is equal to the current flowing through the non-linear resistor 5; and $I_2 = K_1^2 E_1^3$ which is approximately equal to the current flowing through the other non-linear resistor 13. From this we obtain $$\frac{I_1}{I_2} = K \frac{E_2}{E_1}.$$

In these equations I is the current, K is a constant, $E_1$ is the voltage component of the fundamental frequency and $E_2$ is the voltage component of the harmonic frequency. Thus one particular setting of the contacts on the bridge circuit at which no current flows through the meter indicates that a definite proportion of the second harmonic of the modulations is being received. The bridge arrangement 6 may have the contacts of the meter 14 so adjusted that the meter 14 will read zero for an angle at a certain number of degrees to a course such as OC; thus enabling the craft to follow a course such as OG.

In Fig. 5 I have indicated the field pattern of a radio beacon comprising three loop antennæ arranged at angles of 60° to each other. These antennæ transmit carrier currents which are modulated by audio frequency currents similar to those described in connection with the beacon in Fig. 1. The modulation of the three antennæ may be expressed by the following equations: $A(\sin \omega t + \sin 2\omega t)$; $A(\sin (\omega t + 120°) + \sin 2\omega t)$; $A(\sin (\omega t + 240°) + \sin 2\omega t)$; wherein A is a constant; $\omega$ is $2\pi f$, $f$ being the frequency, and $t$ is the time. A carrier wave having one of these modulations is transmitted from each of the loop antennæ in patterns as indicated at H, I, J. The output of a receiver traveling on one of the courses determined by these field patterns will now consist of two frequencies of practically constant amplitude, but with the phase angle between them a function of the position of the receiver with respect to the beacon transmitter. As the receiver makes a complete circuit around the transmitter, the phase of the fundamental frequency in the output circuit of the receiver shifts two cycles of the fundamental with respect to the second harmonic frequency. When the two waves are in the same phase or 180° out of phase, the resultant wave in the output circuit of the receiver will be symmetrical and there will be no direct current flowing through the meter. This will occur eight times around the circuit or in other words, the courses are at an angle of 45° to each other.

Any one of the eight courses may be followed by a craft provided with a receiver such as disclosed in Fig. 2. Courses other than the eight provided by the beacon may be flown by utilizing a receiver such as disclosed in Fig. 6. The receiver arrangement in Fig. 6 comprises an antenna 1 connected to a receiver 2 which has a phase shifting device 15 connected in the output circuit between the receiver and a non-linear resistor 3 and a zero-center direct current meter 4. The phase shifting device 15 operates to shift the phase relation between the two frequencies present in the output circuit before they are impressed upon the non-linear resistor 3. By adjusting the phase shifter the phases of the two frequencies can be shifted so that it is possible to travel on any desired course. A deviation from such a course, however, will produce an asymmetrical voltage in the output circuit which contains a non-linear resistor 3 because of the presence of harmonic currents having a phase relation to the fundamental other than zero or 180°.

The receiver arrangements disclosed in Figs. 2, 4 and 6 may utilize any other suitable non-linear resistor or combination of elements having the proper resistance-current characteristic. It is furthermore possible to disconnect the apparatus in the output circuit of the receiver 2 and substitute therefor a translating device such as a pair of headphones, thereby to utilize the receiver for the reception of communication.

My invention has the further advantage of being inexpensive and at the same time providing an arrangement wherein the indicating meter at its null position indicates that the craft is following the proper course.

While I have shown and described my invention in connection with certain specific embodiments it will, of course, be understood that I do not wish to be limited thereto, since it is apparent that the principles herein disclosed are susceptible to numerous other applications, and modifications may be made in the circuit arrangements and in the instrumentalities employed without departing from the spirit and scope of my invention as set forth in the appended claims.

What I claim as new and desire to secure by Letters Patent of the United States is:

1. The combination in a radio receiving system, of means for producing an electromotive force having an asymmetrical wave form dependent upon received radio waves, a non-linear resistance, and means to impress said asymmetrical wave on said resistance thereby to produce a unidirectional electromotive force having a polarity dependent upon the asymmetry of the wave form produced.

2. In a radio receiver, the combination of means controlled by received radio waves for producing oscillations having asymmetrical wave forms and means for receiving said oscillations, said latter means including a substantially instantaneously responsive non-linear resistor whereby a distinctive response in accordance with the asymmetry of said wave form is produced.

3. In a radio receiver, the combination of a non-linear resistor, and means for producing oscillations having asymmetrical wave forms and for supplying said oscillations to said resistor, the asymmetry of said wave forms being controlled by received radio waves, said non-linear resistor having a characteristic represented by the equation $R = CI^{-a}$, where $R$ is the resistance, $I$ is the density of current per square inch, $C$ is a constant and $a$ is the slope of the curve represented by said equation when plotted with respect to logarithmic coordinates.

4. The combination, in a radio receiver, of a bilaterally conductive non-linear resistor, means for supplying to said non-linear resistor an electromotive force having either of two different types of oppositely asymmetrical wave forms whereby a unidirectional current flows through said resistor having a polarity dependent upon the wave form of the electromotive force supplied, and means movable in a radio field to control said first means to determine in accordance with the position of said movable means the type of wave form of the electromotive force supplied to said non-linear resistor.

5. The combination, in a radio course finding system for moving bodies, means on said body to produce a plurality of periodically varying currents, having a phase relation dependent upon the position of said body with reference to a predetermined course, a non-linear resistance, means to pass said current through said non-linear resistance thereby to produce a unidirectional current through said resistance having polarity dependent upon the position of said body with reference to said course, and means responsive to the polarity of said current.

6. The combination, in a radio receiver, of a circuit, means for supplying said circuit with a plurality of periodically varying currents having a phase relation therebetween determined by the position of said radio receiver with respect to a transmitting station to which said receiver responds, and means comprising a non-linear resistor for producing a direct current component in said circuit in response to said phase relation, and a device connected to said circuit and energized responsively to said direct current component.

7. The combination, in a radio receiving system having a transmitting station and a receiver, of a circuit, means for supplying said circuit with a plurality of alternating currents having a phase relation variable dependent upon the position of the radio receiver with respect to a transmitting station, means comprising a non-linear resistor device responsive to variations in said phase relation for rectifying said currents, and connections from said circuit to an indicating instrument.

8. A radio course beacon system comprising in combination means for radiating carrier waves in different directions, means for modulating each of said carrier waves with a plurality of low frequency waves, each of said low frequency waves having a predetermined phase relation to each other, a radio receiver responsive to said carrier waves for reproducing said low frequency waves, means in said radio receiver for shifting the phase of certain of said low frequency waves with respect to the other waves of different frequency, and means responsive to the resultant phase relation of said low frequency waves for producing an indication.

9. A radio beacon system including a beacon transmitting station having a plurality of directive antennæ arranged at equal angles to each other, means for generating a plurality of low frequency waves having a fundamental low frequency and a harmonic of said fundamental, said harmonic frequencies all being in phase and said fundamental frequencies having a predetermined phase relation to the harmonic frequency and to each other, means for generating a plurality of carrier waves and modulating each of said carrier waves with one of said fundamental and harmonic frequencies, means for radiating each modulated carrier wave from one of said antennæ to produce a plurality of radio beacon courses, a carrier wave detector arranged to receive said carrier waves, whereby modulated carrier waves received in said detector cooperate to produce in said detector a symmetrical low frequency wave when said receiver is upon any of said courses.

10. A radio beacon system comprising three directive antennæ arranged at equal angles to each other, means for generating a plurality of like carrier waves, means for modulating each of said carrier waves with a fundamental low frequency and a harmonic thereof, said harmonic frequencies all being in phase and said fundamental frequencies being displaced in phase an equal amount with respect to each other and means for transmitting said modulated carrier waves whereby eight beacon courses are obtained wherein the resultant fundamental and harmonic frequencies are in the same phase or 180° out of phase.

11. The combination, of a high frequency receiver adapted for reception of a carrier wave modulated with a fundamental wave and a harmonic thereof, means for indicating variations of said fundamental and harmonics from a predetermined ratio of intensities, and means for adjusting said predetermined ratio.

12. The combination, of a high frequency receiver adapted for reception of a carrier wave modulated with a fundamental wave and a harmonic thereof, an output circuit for said receiver, and means connected in said output circuit for producing distinctive indications upon variation of said fundamental and harmonic in opposite senses from a predetermined ratio of intensities.

13. The combination, of a high frequency receiver adapted for reception of a carrier wave modulated with a fundamental wave and a harmonic thereof, means for indicating variations of said fundamental and harmonics from a predetermined ratio of intensities, and means for adjusting said predetermined ratio, means in said output circuit for adjusting the phase relation between said fundamental and harmonic, and indicating means responsive to said phase relation.

14. In a radio beacon system, means for radiating waves of the same frequency in each of a plurality of different directions, the waves radiated in the different directions being displaced in phase in accordance with the direction in which they are radiated, means to radiate a harmonic of said frequency in all directions in phase, and means carried by a moving body for utilizing the phase relations between said fundamental and harmonic waves to determine the position of the movable body.

HENRY P. THOMAS.